(12) United States Patent
Wilson et al.

(10) Patent No.: US 8,508,320 B2
(45) Date of Patent: Aug. 13, 2013

(54) ANTENNA MOUNTING TO A ROTOR ANTENNA HAVING RADIAL AND AXIAL AIR BEARINGS

(75) Inventors: Derek Ray Wilson, Greenville, SC (US); R. David Jones, Simpsonville, SC (US); Donald Shaw, Simpsonville, SC (US); Raymond Lavigne, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 202 days.

(21) Appl. No.: 12/683,486

(22) Filed: Jan. 7, 2010

(65) Prior Publication Data

US 2011/0165840 A1 Jul. 7, 2011

(51) Int. Cl.
*H01P 1/06* (2006.01)
(52) U.S. Cl.
USPC ............ 333/256; 333/257; 343/763; 343/766
(58) Field of Classification Search
USPC .................. 333/256, 257, 261; 343/763, 766
See application file for complete search history.

(56) References Cited

U.S. PATENT DOCUMENTS

| 4,516,097 | A | * | 5/1985 | Munson et al. | ............... 333/261 |
| 2008/0278267 | A1 | * | 11/2008 | Beckley et al. | ............... 333/261 |
| 2008/0303614 | A1 | * | 12/2008 | Fischer et al. | ................ 333/261 |

FOREIGN PATENT DOCUMENTS

JP 57154516 A 9/1982

* cited by examiner

*Primary Examiner* — Benny Lee
(74) *Attorney, Agent, or Firm* — Sutherland Asbill & Brennan LLP

(57) ABSTRACT

Certain embodiments of the invention may include systems and methods for providing a translating telemetry stationary antenna. According to an example embodiment of the invention, a method is provided for automatically aligning a stationary antenna with a corresponding rotor antenna. The method provides for mounting a stationary antenna with respect to a rotor antenna associated with a rotor. The method includes mounting a stationary antenna to an inner circumference of a support frame, mounting a plurality of radial air bearings to the support frame for maintaining radial alignment of the stationary antenna with respect to the rotor antenna, and mounting a plurality of axial air bearings to the support frame for maintaining axial alignment of the stationary antenna with respect to the rotor antenna.

15 Claims, 5 Drawing Sheets

US 8,508,320 B2

ANTENNA MOUNTING TO A ROTOR ANTENNA HAVING RADIAL AND AXIAL AIR BEARINGS

FIELD OF THE INVENTION

This invention generally relates to antennas associated with rotating components, and more particularly, to translating telemetry stationary antennas.

BACKGROUND OF THE INVENTION

Rotating shafts and rotors are utilized in many machines, including motors, generators, and turbines to efficiently transmit kinetic energy between components within or external to the machine. Typically, the rotors associated with a machine rotate about an axis relative to a stationary frame of reference. The stationary frame of reference may be defined as the non-rotating part machine. In some cases, particularly in electrical motors and generators, an electrical connection must be made between the stationary part of the machine and the rotating part of the machine. Direct current electrical motors and generators, for example, utilize brushes to electrically connect and commutate stationary current sources or sinks with electrical windings on the rotor.

Slip rings are also utilized for establishing a connection to a rotor. A slip ring consists of a conductive circle or band mounted on a rotor, but electrically insulated from the rotor and other slip rings. Electrical connections from components on the rotor may be connected to the slip rings, and stationary contacts or brushes can rub against rings to transfer electrical power or signals to and from the stationary part of the machine.

In certain machines, however, slip rings, brushes, and mechanical contacts can wear out, and they may not be practical in terms of durability and reliability. Furthermore, rubbing mechanical contacts against a slip ring may effectively degrade signals and may induce unwanted noise and/or impose limits in the signal bandwidth such that communications between the rotor and stationary part of the machine is compromised.

To overcome such limitations, rotary antenna systems have been proposed for providing non-contact electrical communications (telemetry) between a rotating and stationary part of a machine. Rotary antennas typically consist of a pair of circular "hoop"-shaped and concentrically aligned antennas: one attached to the rotating part, and one attached to the stationary part of the machine. The rotating antenna and the stationary typically must be carefully aligned both axially and radially with a minimum air gap separation for suitable coupling between antennas. Therefore, heavy and complex support structures are typically utilized to mount the stationary antenna to the stationary part of the machine. Manual alignment of the stationary antenna with respect to the rotating antenna is often a time consuming and tedious task, requiring multi-dimensional adjustments of the stationary antenna. Furthermore, if the rotor translates with respect to the stationary frame (due to expansion, contraction, or other factors), the antennas may become misaligned during operation and communications and or inductive power transfer between the antennas may be interrupted.

Therefore, a need remains for improved systems and methods for a translating telemetry stationary antenna.

BRIEF SUMMARY OF THE INVENTION

Some or all of the above needs may be addressed by certain embodiments of the invention. Certain embodiments of the invention may include systems and methods for a translating telemetry stationary antenna.

According to an exemplary embodiment of the invention, a method for mounting a stationary antenna with respect to a rotor antenna associated with a rotating component is provided. The method includes mounting a stationary antenna to an inner circumference of a support frame, mounting a plurality of radial air bearings to the support frame for maintaining radial alignment of the stationary antenna with respect to the rotor antenna, and mounting a plurality of axial air bearings to the support frame for maintaining axial alignment of the stationary antenna with respect to the rotor antenna.

According to another exemplary embodiment, a method of communication between a rotor antenna mounted to a rotating component and a stationary antenna is provided. The method includes mounting a stationary antenna to at least a portion of an inner circumference of a support frame, where radial alignment and axial alignment of the stationary antenna with respect to the rotor antenna are maintained by a plurality of air bearings. The method also includes transferring a signal between the stationary antenna and the rotor antenna.

According to another exemplary embodiment, an apparatus is provided for communication with a rotor antenna. The apparatus includes a support frame and a stationary antenna mounted to a support frame. The stationary antenna is maintained in axial alignment and radial alignment with respect to the rotor antenna by a plurality of air bearings, and the stationary antenna is operable to communicate with the stationary antenna.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The term "exemplary" as used throughout this document is defined to mean "example."

Certain embodiments of the invention may enable communication between a rotating and a stationary antenna. According to certain exemplary embodiments of the invention, a stationary antenna may maintain axial and radial self-alignment with a corresponding rotating antenna attached to a rotor.

According to exemplary embodiments of the invention, various air bearings and floating support systems may be utilized to maintain alignment of a stationary antenna with respect to a rotating antenna. Exemplary systems and methods will be described with reference to accompanying figures, with the exception of FIG. 1, which illustrates a conventional system and method for mounting a stationary antenna.

Figure 1:
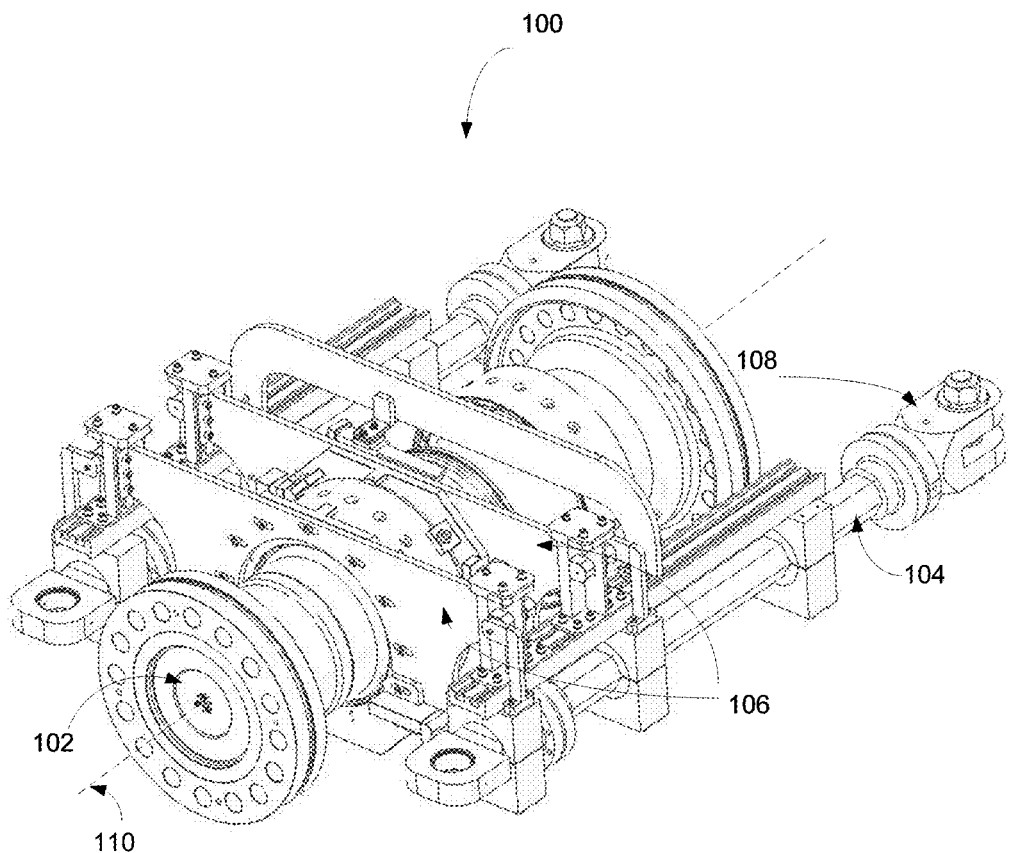
FIG. 1 is a perspective view of a conventional rotor with a support mount for a stationary antenna tied to a stationary part of a machine.

FIG. 1 illustrates a conventional stationary antenna mounting system 100 for purpose of comparison with the invention. The system 100 includes stationary antenna supports 106 attached to tie rods 104. The tie rods 104 are further attached to a stationary part of the machine (not shown) via stationary frame mounts 108 that are connected to the tie rods 104. Stationary antennas are attached to stationary antenna supports 106, and rotating antennas are attached to the rotor 102. The system 100 requires expensive, heavy, and complex mounting alignment components, and there are no provisions for maintaining dynamic axial and/or radial alignment of the stationary antenna with the rotating antenna as the rotor translates along the axis of rotation 110, or as the rotor drifts perpendicular to the axis of rotation 110 during operation of the machine.

Figure 2:
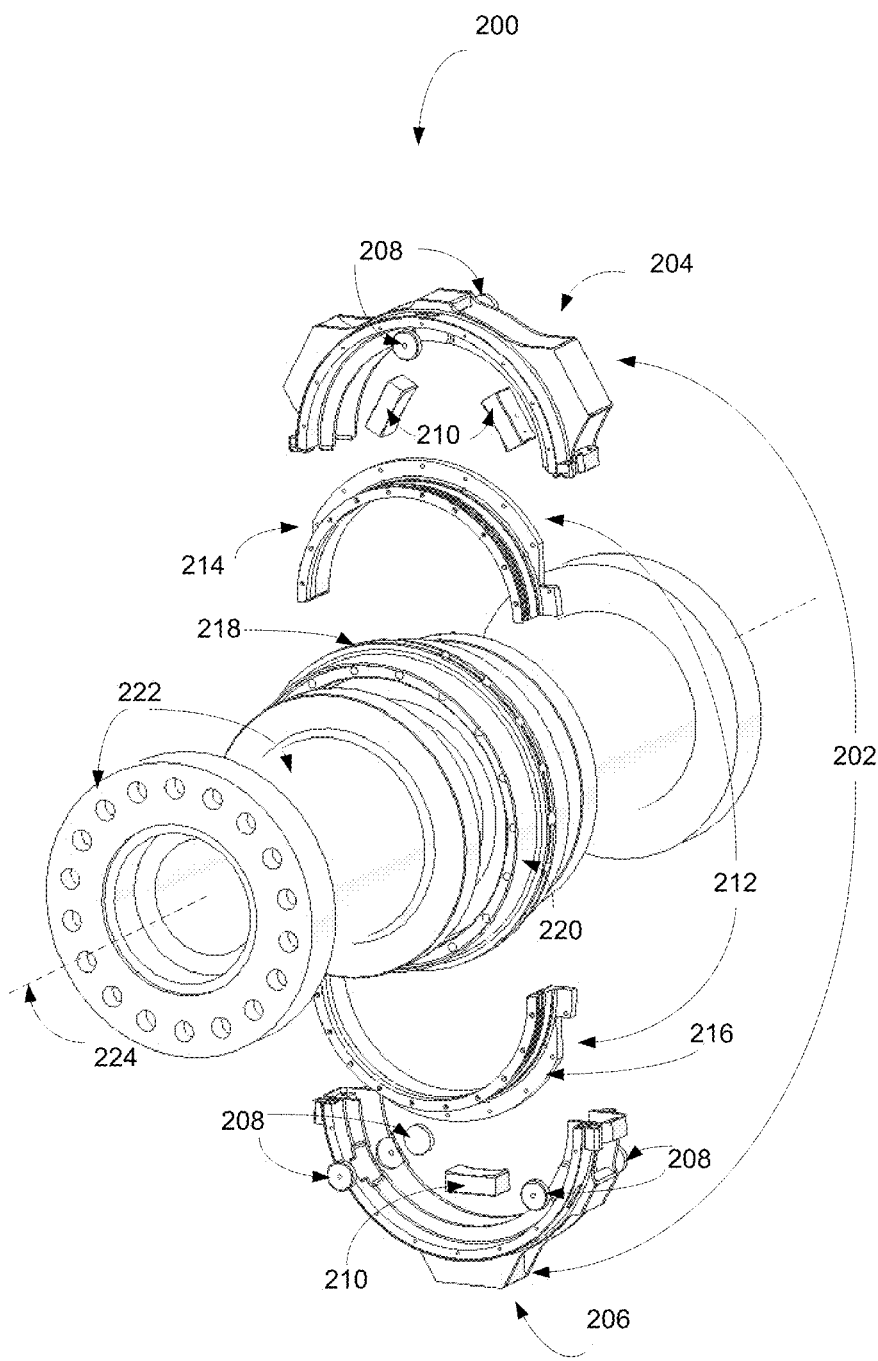
FIG. 2 is a perspective view of an illustrative translating telemetry stationary antenna, according to an exemplary embodiment of the invention.

In contrast, FIG. 2 depicts a perspective view of a translating telemetry stationary antenna system 200, according to an exemplary embodiment of the invention. Air bearings 208, 210 may be utilized in accordance with exemplary embodiments of the invention to dynamically align a stationary antenna 212 with a rotor antenna 218. According to exemplary embodiments, axial bearings 208 and radial bearings 210 may be mounted to support frame 202. According to exemplary embodiments of the invention, the support frame 202 may include a top-half frame 204 and a bottom-half frame 206 to facilitate assembly, and for enclosing the support frame 202 and associated components around the circumference of the rotor 222.

According to exemplary embodiments of the invention, the stationary antenna 212 may include a top-half stationary antenna section 214 and a bottom-half stationary antenna section 216. According to exemplary embodiments of the invention, the stationary antenna 212 may be mounted to the support frame 202, and the combined assembly 202, 212 may provide axial and radial alignment of the stationary antenna 212 with the rotor antenna 218 via the air bearings 208, 210. For example, the support frame 202 may house three or more radial bearings 210, positioned and mounted equidistant around the inner circumference of the support frame 202. The radial bearings 210 may communicate radially with a mating surface on the rotor 222, and may facilitate radial alignment of the stationary antenna 212 with the rotor antenna 218. When air is forced through the radial bearings 210, the rotor 222 and rotor antenna 218 may rotate freely about the axis of rotation 224 in relation to the combined support frame 202 and the stationary antenna 212. This exemplary embodiment also allows, for example, an air delivery system to be hooked to the air bearings 208, 210 on the support frame 202.

According to an exemplary embodiment of the invention, the support frame 202 may also include one or more axial bearings 208. The axial bearings 208 may be operable to maintain axial alignment of the stationary antenna 212 with the rotor antenna 218. The axial bearings 208 may communicate axially with a mating surface associated with the rotor 222. For example, the axial bearings 208 may communicate with an axial bearing flange 220 attached to the rotor 222. When air is forced through the axial bearings 208, the rotor 222 and rotor antenna 218 may rotate freely about the axis of rotation 224 in relation to the combined support frame 202 and the stationary antenna 212, while at the same time, the axial alignment of the stationary antenna 212 may be maintained with the rotor antenna 218.

According to exemplary embodiments of the invention, the translating telemetry stationary antenna system 200 may be utilized for communicating signals between the rotating antenna and the stationary antenna 212. For example, various measurement and/or control devices including transducers, sensors, strain gauges, accelerometers, tachometers etc., may be attached to the rotor 222 for measuring various parameters associated with the machine. The measurement and/or control devices may be attached to the rotor 222, and their power ports may be connected to a rotor antenna 218 in communication with a stationary antenna 212. In this exemplary configuration, the translating telemetry stationary antenna system 200 may act as a power transmission device to couple power from the stationary antenna 212 to the rotor antenna 218 for powering the measurement and/or control devices attached to the rotor 222. A combined or separate translating telemetry stationary antenna system 200 may also be utilized to transmit signals from the measurement and/or control devices attached to the rotor 222 via the rotor antenna 218 to a stationary receiver in communication with the stationary antenna 212. For example, in one embodiment, the stationary antenna 212 may include one antenna element operable to transmit power to a corresponding dedicated (power) rotor antenna 218, and the same stationary antenna 212 may also include another antenna element operable to receive signals from a corresponding dedicated (signal) rotor antenna 218. In another embodiment, the power and signal antennas may be combined.

Figure 3:
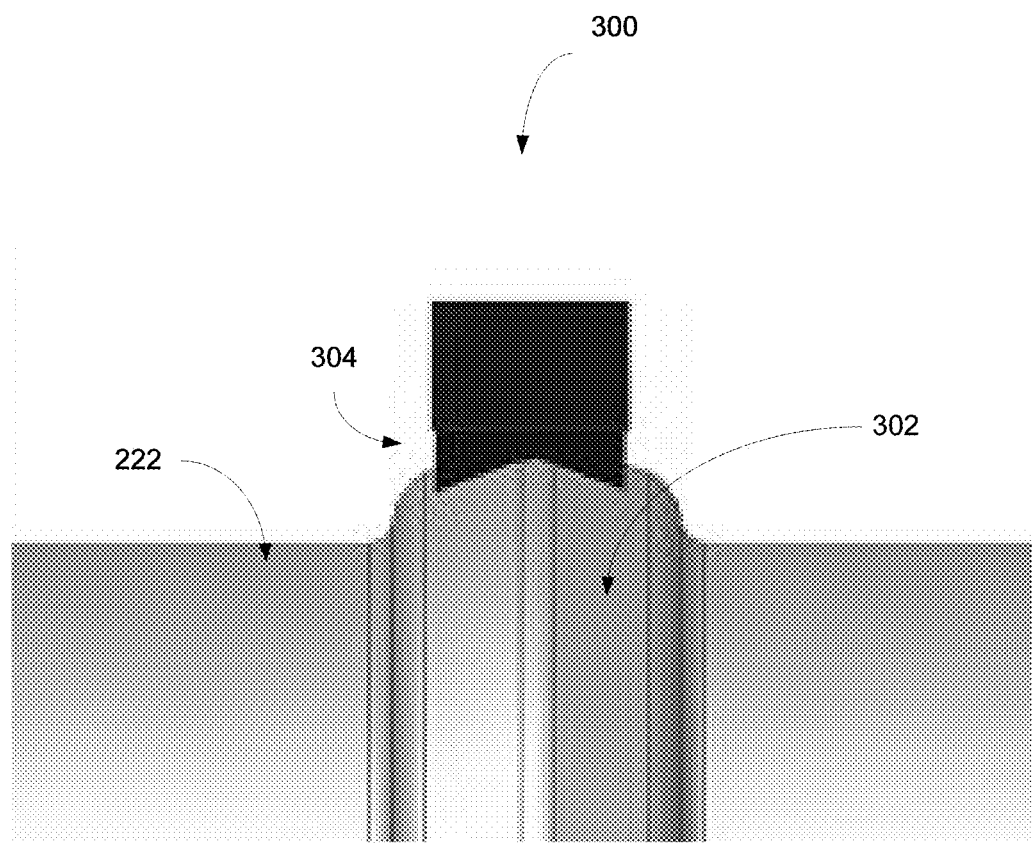
FIG. 3 is a perspective side view of an illustrative rotor mating surface and associated air bearing according to an exemplary embodiment of the invention.

According to other exemplary embodiments of the invention, various combinations and configurations of the air bearing placements and shapes may be utilized to reduce the cost, weight, and complexity of the translating telemetry stationary antenna system 200. For example, FIG. 3 depicts an illustrative combined radial and axial alignment system 300. In this exemplary embodiment, the function of a radial bearing 210 and an axial bearing 208, in FIG. 2, may be combined by defining a protruding mating surface 302 around the circumference of the rotor 222. One or more corresponding air bearings 304 inversely matched to the protruding mating surface 302 may serve to align the stationary antenna 212 with the rotor antenna 218 in both the radial and axial directions. In another embodiment, the combined radial and axial alignment system 300 may be accomplished by defining a recessed mating surface (not shown) around the circumference of the rotor 222 instead of a protruding mating surface 302. In this exemplary embodiment, the corresponding air bearing 304 may have a matching protruding surface (not shown) that mates with the recessed mating surface to align the stationary antenna 212 with the rotor antenna 218 in both the radial and axial directions. In exemplary embodiments of the invention, the mating surface profile and the corresponding air bearing surface profile may include any of the following: V-profiles, U-profiles, W-profiles, or any combination of profiles that provide radial and axial alignment.

Figure 4:
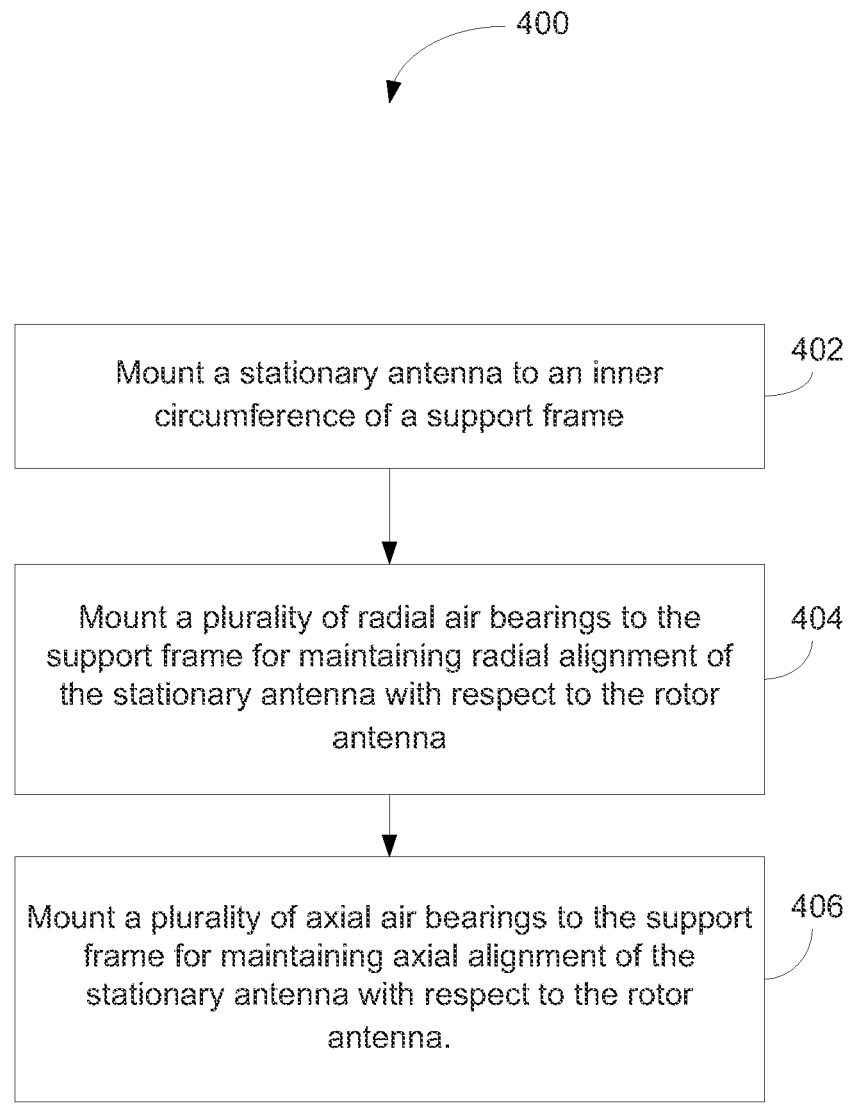
FIG. 4 is a flow diagram of an exemplary method according to an exemplary embodiment of the invention.

An exemplary method 400 for mounting a translating telemetry stationary antenna system 200 will now be described with reference to the flowchart of FIG. 4. In block 402 and according to an exemplary embodiment of the invention, a stationary antenna may be mounted to an inner circumference of a support frame. As indicated in FIG. 2 and described above, both the stationary antenna and the support frame may be assembled in pieces. For example, the stationary antenna may include a top-half stationary antenna section 214 and a bottom-half stationary antenna section 216. Likewise, the support frame may include a top-half frame 204 and a bottom-half frame 206. In block 404, and according to an exemplary embodiment, a plurality of radial air bearings 210 may be mounted to the support frame for maintaining radial alignment of the stationary antenna 212 with respect to the rotor antenna 218. In block 406, and according to an exemplary embodiment, a plurality of axial air bearings 208 may be mounted to the support frame 202 for maintaining axial alignment of the stationary antenna 212 with respect to the rotor antenna 218.

Figure 5:
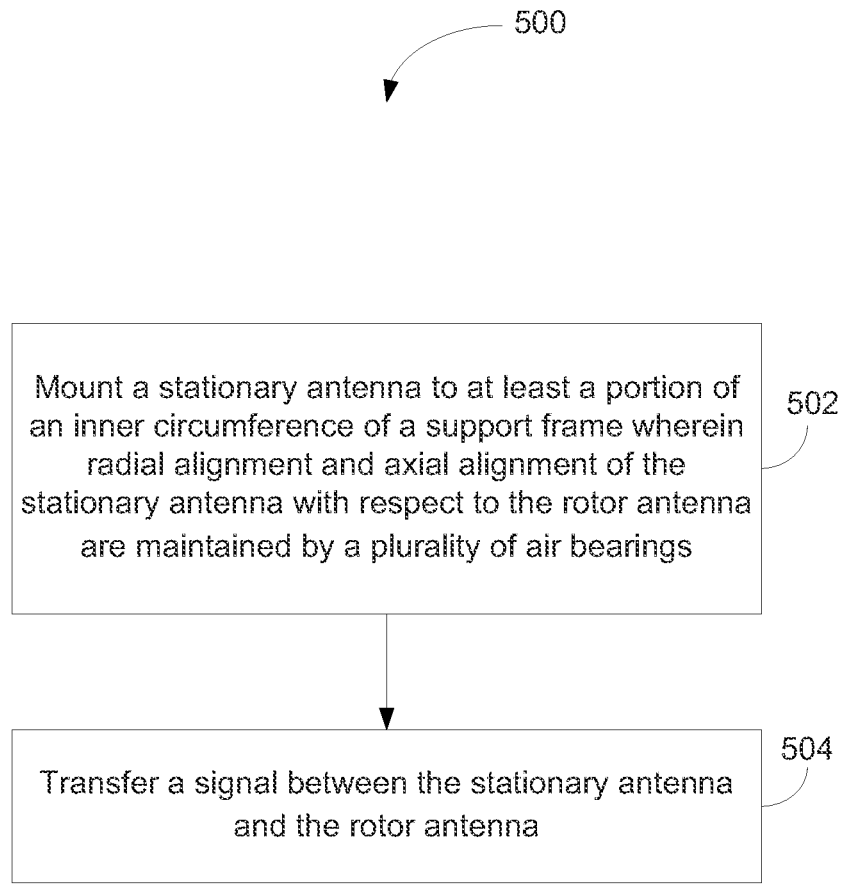
FIG. 5 is a flow diagram of an exemplary method according to an exemplary embodiment of the invention.

An exemplary method 500 for utilizing the translating telemetry stationary antenna system 200 to communicate between a stationary component and a rotating component will now be described with reference to the flowchart of FIG. 5. In block 502, according to an exemplary embodiment of invention, the stationary antenna 212 may be mounted to at least a portion of an inner circumference of a support frame 202, where the radial alignment and axial alignment of the stationary antenna 212 is maintained with respect to the rotor antenna 218 by a plurality of air bearings. In block 504, a signal may be transferred between the stationary antenna 212 and the rotor antenna 218.

Accordingly, exemplary embodiments of the invention can provide the technical effects of creating certain systems and methods that provide for signal energy (including power) to be coupled between a pair of non-contacting antennas, where one antenna may be stationary, and the other antenna may be attached to a rotating component. Exemplary embodiments of the invention can provide the further technical effects of providing systems and methods for reducing the weight, cost, and/or complexity associated with a telemetry system. Furthermore, exemplary embodiments of the invention can provide the technical effects of maintaining axial and radial alignment between a stationary antenna 212 and a rotor antenna 218, as the rotor 222 translates with respect to a stationary part of an associated machine. Exemplary embodiments of the invention can also provide the further technical effects of providing systems and methods for electrically isolating the stationary antenna 212 from the rotating antenna 218, thereby improving the data acquisition signal quality by eliminating a ground path between sensors and the data acquisition system.

As desired, embodiments of the invention may include the translating telemetry stationary antenna system 200 with more or less of the components illustrated in FIGS. 2 and 3.

The invention is described above with reference to block and flow diagrams of systems, methods, and/or apparatuses according to exemplary embodiments of the invention. It will be understood that some blocks of the block diagrams and flow diagrams may not necessarily need to be performed in the order presented, or may not necessarily need to be performed at all, according to some embodiments of the invention.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for mounting an antenna with respect to a rotor antenna associated with a rotor, the method comprising:
    mounting the antenna to an inner circumference of a support frame, wherein the support frame comprises a plurality of frame sections for mounting the support frames coaxially adjacent to the rotor antenna;
    mounting a plurality of radial air bearings to the support frame, the radial air bearings configured to maintain radial alignment of the antenna mounted thereto with respect to the rotor antenna; and
    mounting a plurality of axial air bearings to the support frame, the axial air bearings configured to maintain axial alignment of the antenna mounted thereto with respect to the rotor antenna.

2. The method of claim 1, wherein the antenna as coupled to the support frame via the radial air bearings and axial air bearings is axially aligned with the rotor antenna via communication with a rotor flange.

3. The method of claim 1, wherein the antenna further comprises a top-half antenna section and a bottom-half antenna section, wherein a combined assembly is mounted to the support frame.

4. The method of claim 1, wherein the rotor comprises a rotor flange for maintaining axial alignment of the antenna with the rotor antenna.

5. An apparatus for communication with a rotor antenna; the apparatus comprising:
    a support frame, wherein the support frame comprises a plurality of frame sections for mounting the support frame coaxially adjacent to the rotor antenna; and
    an antenna mounted to a support frame maintained in axial alignment and radial alignment with respect to the rotor antenna by a plurality of air bearings, wherein the antenna is operable to communicate with the rotor antenna.

6. The apparatus of claim 5, wherein the antenna the antenna further comprises a top-half antenna section and a bottom-half antenna section, wherein a combined assembly is mounted to the support frame.

7. The apparatus of claim 5, further comprising a rotor, wherein the rotor comprises a rotor flange for maintaining axial alignment of the antenna with the rotor antenna.

8. The apparatus of claim 7, wherein the antenna as coupled to the support frame via the plurality of air bearings is axially aligned with the rotor antenna via communication with the rotor flange.

9. A method of communication between a rotor antenna mounted to a rotor and an antenna, the method comprising:
    securing the antenna to at least a portion of an inner circumference of a support frame;
    aligning the antenna radially and axially with respect to the rotor antenna by a plurality of air bearings mating with a mating surface of the rotor, thereby permitting motion of the rotor antenna relative to the support frame, wherein the mating surface comprises one of the following: i) a protruding surface or ii) a recessed surface; and transferring a signal between the antenna and the rotor antenna.

10. The method of claim 9, wherein the support frame comprises a plurality of frame sections enclosing the support frame around the circumference of the rotor.

11. The method of claim 9, wherein the antenna comprises a plurality of antenna sections for mounting the antenna coaxially adjacent the rotor antenna.

12. The method of claim 9, wherein the rotor comprises a rotor flange for maintaining axial alignment of the antenna with the rotor antenna.

13. The method of claim 9, wherein the antenna coupled to the support frame via the radial air bearings and axial air bearings is axially aligned with the rotor antenna via mating with a surface of a rotor flange.

14. The method of claim 9, wherein transferring a signal comprises transmitting, via the antenna, a signal from a transmitter in communication with the antenna and receiving the transmitted signal via a receiver mounted to the rotor.

15. The method of claim 9, wherein transferring a signal comprises transmitting, via the rotor antenna, a signal from a transmitter mounted to the rotor and receiving the transmitted signal via a receiver in communication with the antenna.

* * * * *